C. A. BECKER.
WEIGHING SCALE.
APPLICATION FILED JUNE 23, 1915.

1,203,686.

Patented Nov. 7, 1916.
2 SHEETS—SHEET 1.

WITNESSES:
René Pluine
Fred White

INVENTOR
Christopher A. Becker,
By Attorneys,

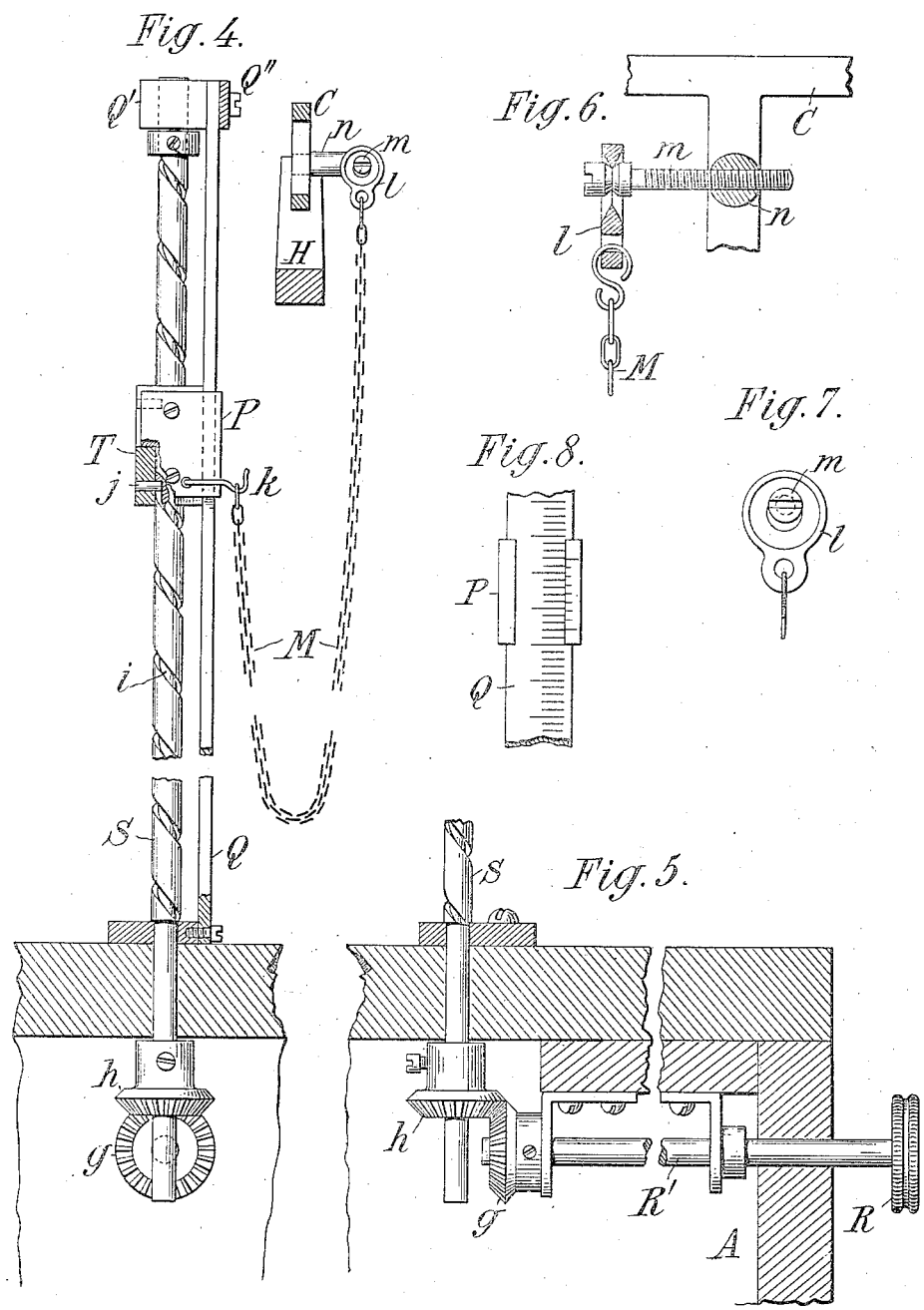

UNITED STATES PATENT OFFICE.

CHRISTOPHER A. BECKER, OF NEW YORK, N. Y., ASSIGNOR TO THE TORSION BALANCE COMPANY, OF NEW YORK, N. Y., A CORPORATION OF NEW YORK.

WEIGHING-SCALE.

1,203,686. Specification of Letters Patent. Patented Nov. 7, 1916.

Application filed June 23, 1915. Serial No. 35,789.

*To all whom it may concern:*

Be it known that I, CHRISTOPHER A. BECKER, a citizen of the United States of America, residing in the borough of Manhattan, city, county, and State of New York, have invented certain new and useful Improvements in Weighing-Scales, of which the following is a specification.

This invention relates to weighing scales or balances, and particularly to such incased balances as are applied to very fine or delicate weighing such as are used by analysts, jewelers and others who have occasion to weigh objects or quantities of light weight and with great accuracy. Such scales or balances are commonly constructed with a balance beam hung at its middle on knife edges, and having scale pans hung from its ends, all inclosed in a case to protect the movable parts from disturbance by air currents. In one pan the article to be weighed is placed, and in the other the operator places weights until the scale reaches poise. Sometimes a slide weight or slider is provided on either side of the beam, which can be slid along a graduated part thereof instead of the use of separate weights, or supplemental thereto. A third possible way of operating such balance is to provide a chain of suitable weight, and the links of which are practically alike in weight, hanging one end of this chain to the beam and the other end to a stationary part, and transferring more or less of the weight of the chain from the beam to the stationary part, or vice versa, until so much of the weight of the chain hangs from the beam as will counterpoise the object to be weighed. This third method is the one availed of according to my invention either in lieu of or in association with either or both of the other methods referred to.

The manipulation of such a chain weight especially in an inclosed balance, and the determination after the scale has been brought to poise of the weight thereby resulting, involve practical difficulties which are obviated by my invention.

The nature of the invention will be made apparent as the description proceeds, reference being had to the accompanying drawings, wherein,—

Figure 1:
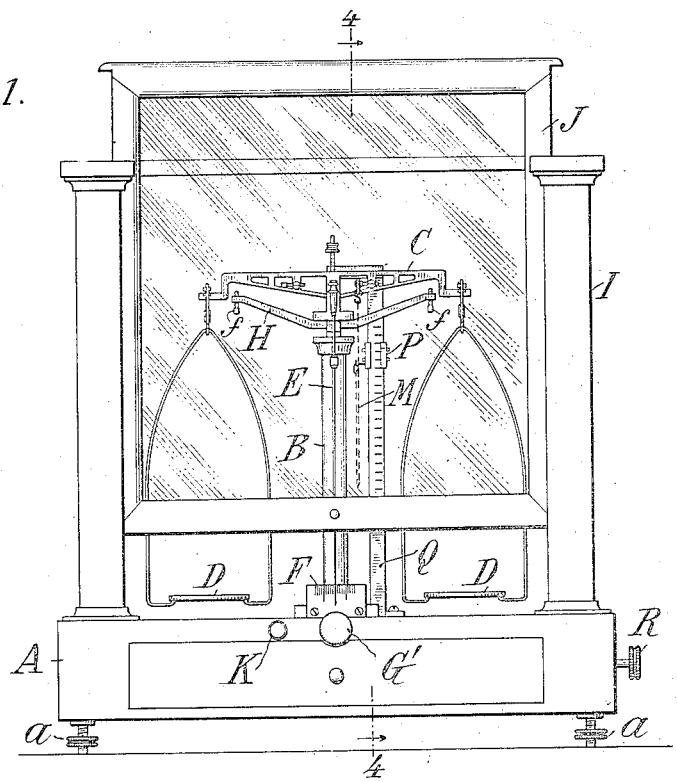
Figure 2:
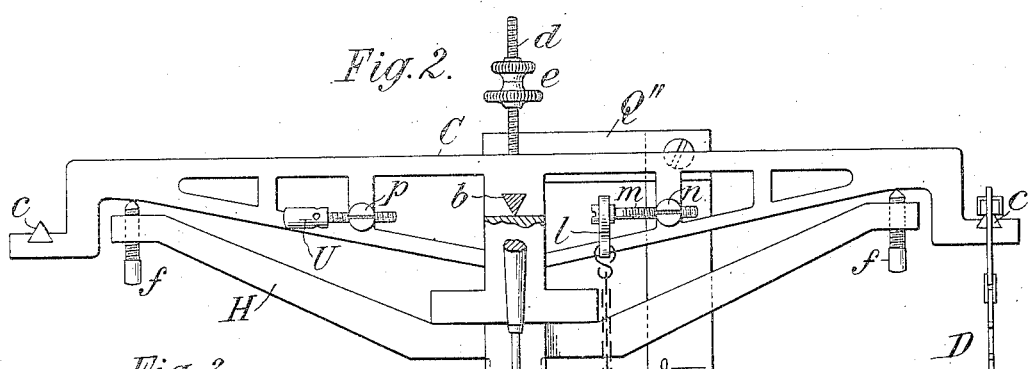
Figure 3:
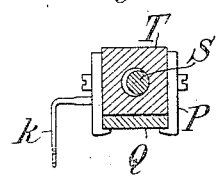
Figure 3:
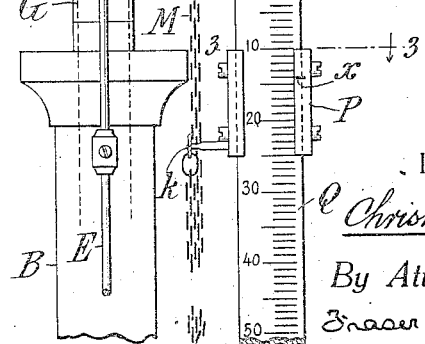

Figure 1 is a front elevation of a laboratory scale with its inclosing casing, the sliding front thereof being partly lifted. Fig. 2 is an elevation of the scale beam and its appurtenances. Fig. 3 is a transverse section on the line 3—3 in Fig. 2. Fig. 4 is a fragmentary vertical section taken generally on the line 4—4 in Fig. 1; Fig. 5 is a fragmentary vertical section looking from the front. Fig. 6 is a sectional front view showing in detail the hanger by which the chain is hung on the beam. Fig. 7 is an elevation of this hanger from the left in Fig. 6. Fig. 8 is a fragmentary elevation of the slide and graduating guide, showing vernier graduations. Figs. 2 to 5 inclusive and Fig. 8 are drawn to a larger scale than Fig. 1, and Figs. 6 and 7 to a still larger scale.

In general, the scale or balance is of a construction usual in laboratory or jewelers' balances. The construction shown has a base A with suitable leveling screws $a\ a$; projecting up from this base is a central column B, on the top of which through the usual knife edge joint $b$ (shown in section in Fig. 2) is mounted the balance beam C having arms of equal length, from which through the usual knife edges $c\ c$ are hung scale pans D D or any other means whereby the objects to be weighed or any counterbalancing weights are to be suspended from the beam. Instead of knife edges, any other equivalent pivotal or rocking connections may be substituted, reference being made to the well known torsion balance construction which has been for many years in use.

The balance beam may have any usual adjustments such as an upright threaded stem $d$ projecting from it above its knife edge fulcrum on which screw adjusting weights $e$ in the form of nuts, as shown; and any other means known in the art for counterbalancing or adjusting the beam or for weighing off tare, may be applied. The beam is shown provided with a pointer E traversing graduations at F to show when the balance comes to poise. The drawing shows the balance as provided with the usual means for bringing the beam to a level and lifting it slightly off its knife edge fulcrum, consisting of a vertically moving slide G passing through the column B, as shown in dotted lines in Fig. 2, and carrying at its upper part T-arms H extending beneath the beam, so that when elevated its ends take under and slightly lift the beam, and having also the usual arms, not shown, for taking under the prolongation of the knife edges $b$, so that the beam is lifted without possibility of tilting. The T-arms have the usual adjusting screws $f\ f$ for engaging under the beam. The beam lifter is shown down in Fig. 1 and elevated in Fig. 2. In Fig. 1 the balance is shown inclosed within the usual case I, having sides of glass and a sliding front door J which is shown partly lifted. At the front of the case is a thumb wheel G' by turning which the slide G is raised or lowered; and also a push button K which operates the usual pan lifters for holding the scale pans during the operations of applying or removing the objects to be weighed and the counterbalance weights.

So far as described the balance is of the usual construction and requires no detailed description.

M is the weighing chain, which according to this invention is hung at one end from one arm of the scale beam and at the other end from a slide P which is movable up and down on a vertical guide Q. The chain hangs in a catenary curve between its opposite supports as shown in Fig. 4. As the slide P is raised more of the weight of the chain is taken from the beam and hangs from the slide, which after any adjustment forms a stationary support for upholding the inactive part of the chain. The part of the chain which hangs from the beam is the active part, the weight of which is applied to the arm of the beam from which it is hung, and which arm is ordinarily the opposite arm to that from which hangs the scale pan which is to receive the object to be weighed. As the slide P is lowered a greater portion of the weight of the chain is transferred to the beam. To read the effective weight of the chain, the vertical guide Q is provided with graduations according to any desired denomination representing for example grains, milligrams, carats, etc., so that when a mark $x$ on the slide registers with one of these graduations, the weight of the object being weighed may be directly read off. It is assumed that the links of the chain are of uniform weight, in which case the graduations are uniformly spaced.

For a delicate balance where an inclosing case is necessary, it is highly desirable to be able to operate the counterbalancing weight so as to bring the scale to poise without having to open the casing. To this end I provide for raising and lowering the slide P from the exterior of the incased instrument. For this purpose a rotary operating handle or thumb wheel R is provided at the right hand of the base of the casing. This thumb wheel is fixed on a shaft R' which through miter gears $g\ h$ communicates rotation to an upright shaft S located directly behind the vertical guide Q, and having cut in it a groove or screwthread $i$ of suitable pitch. The slide P comprises a nut T which engages this groove or screwthread. In the construction shown the nut has a pin $j$ entering the thread. Hence by turning the thumb wheel R the slide P is raised or lowered, and will remain in any position in which it is left. The shaft S has a bearing at the bottom in the base A, and at its top in a head Q' mounted on the upright guide Q and braced from the column B by a cross arm Q''.

The slide P has projecting from it a hook $k$ from which a terminal ring or link at one end of the chain is hung. The opposite end of the chain has a terminal ring or hook hung in any suitable manner to the beam. The preferred construction is that shown best in Figs. 6 and 7, where the chain is hung from an eye or ring $l$, its inner part being reduced to a knife edge and slipped over the head of a screw $m$, which has a V-groove receiving this knife edge, as clearly shown in Fig. 6. The screw $m$ screws into a post $n$ projecting from the beam C and may be screwed out or in in order to bring the point of application of the weight of the chain at the desired distance from the axis of the knife edge fulcrum.

The beam C is provided with an adjustable counterweight U consisting of a screw having a heavy head and screwing into a post $p$ on the beam. This counterweight has the function of counterbalancing the weight of the screw $m$, ring $l$, and such part of the weight of the chain M as cannot be transferred to the slide P. Obviously it is impossible to raise the slide P high enough to remove all the weight of the chain from the beam, and in practice it is preferable to adopt about the proportions shown, where the slide moves up to about the level of the beam, or only slightly higher, in which position approximately half of the weight of the chain may hang from the beam. Whatever be the proportions, it is desirable when the slide P is brought to the zero position that whatever weight of the chain and its connections hangs from the beam shall be counterpoised by an adjustment of the counterweight U, so that the scale shall be perfectly balanced with no weight on either pan.

The alinement of the chain may be varied by an adjustment of the screw $m$ to bring the chain toward or from the knife edge fulcrum; or by a vertical adjustment of the slide P whereby more or less of the weight of the chain is transferred from the beam to the support afforded by this slide. The former adjustment is made once for all in the original assembling and adjustment of the scale or balance. This adjustment and that of the counterpoise U enables the scale to be brought into proper harmony with the graduations on the guide Q (assuming the guide to have been marked with graduations previous to adjustment as is preferable in actual manufacture).

The described construction lends itself readily to the application of a vernier for taking very fine readings, an example of which is shown in Fig. 8. For this purpose both the slide P and guide Q are graduated, their respective graduations differing by one unit, that is to say, for ten graduations on the one there will be usually nine on the other. In Fig. 8 the slide has nine graduations to ten on the guide.

The invention is susceptible of a certain degree of modification in its structural features, as will be apparent. The construction shown is considered the best for a laboratory balance or similar scale of great nicety.

In scales or balances having a counterbalancing chain as heretofore proposed, the adjustable or dead end of the chain has been hung to a slide having a frictional engagement with a vertical guiding part and being moved up or down by direct manipulation by the hand of the operator. Such construction lacks one of the most important inherent advantages of the use of a chain counterbalance, namely, the ability, by minute adjustment, to weigh to practically infinitesimal graduations by the gradual transfer of the weight of the link or links at the bottom of the catenary curve from the beam to the dead end support, or vice versa; this being impossible of realization because the hand in overcoming the static friction necessary to insure the retention of the chain-carrying slide in any stationary position has almost invariably the effect of displacing it too far (because of the lesser resistance of sliding friction as compared with static friction), so that numerous readjustments are necessary before a minutely exact poise can be attained. Such construction if applied to an inclosed balance would require re-opening its casing at each adjustment, and the necessity for this deprives the chain type of balance of any material advantage over those requiring manual adjustment of a counterpoising weight or weights. The present invention, by providing for an adjustment of infinite nicety which admits of unprecedented rapidity in counterpoising, and which in an inclosed balance may be accomplished from the exterior without opening the casing, provides a scale or balance having important practical advantages over any weighing means heretofore used. The provision of a rotary operating handle and screw-propelling means practically overcomes the difficulty due to static friction, and renders the operation of weighing one of unprecedented rapidity and certainty.

I claim as my invention:—

1. In a scale or balance, the combination of a scale beam, means whereon said beam is pivoted including a supporting base for the scale, a weighing chain hanging at one end from the beam, a vertically movable slide to which the other end of the chain is hung, an upright guide for the slide, a shaft rotatably supported on the base, and provided with an operating handle at one side of the base, and means controlled by said shaft for operating the slide and including a rotatable member extending from the base parallel to the guide.

2. In a scale or balance, the combination of a scale beam, means whereon said beam is pivoted including a supporting base for the scale, a weighing chain hanging at one end from the beam, a vertically movable slide to which the other end of the chain is hung, an upright guide for the slide, a shaft rotatably supported on the base, and provided with an operating handle at one side of the base, and means controlled by said shaft for operating the slide and including a member extending from the base parallel to the guide, and having screw-threaded connection with the slide.

3. In a scale or balance, the combination of a scale beam, means whereon said beam is pivoted including a supporting base for the scale, a weighing chain hanging at one end from the beam, a vertically movable slide to which the other end of the chain is hung, an upright guide for the slide, and means for operating the slide including a rotatable operating handle adjacent the base and an upright rod operatively connected to said handle and extending from the base parallel to the guide, said rod having a spiral groove, and means connected to said slide engaging said groove.

4. In a scale or balance, the combination of a scale beam, a case inclosing the same, a weighing chain entirely within the case hung at one end from the beam and adjustable at its other end to vary the proportion of its length which shall be carried by the beam, means for indicating the proportion of the weight of the chain supported by the beam, and means operable from outside the case for effecting such adjustment.

5. In a scale or balance, the combination of a scale beam, a case inclosing the same, a weighing chain hung at one end from the beam, a slide to which the other end of the chain is hung, an upright guide for said slide, said guide and slide having reciprocal graduations for indicating the proportion of the weight of the chain supported by the beam, a threaded rod for adjusting it, said chain, slide, guide and threaded rod being all inclosed within the case, and means operable from outside the case for turning said threaded rod, so as to effect a balancing adjustment of the slide and to maintain it at the point of balance without opening the case.

6. In a scale or balance, the combination of a scale beam, a weighing chain hung at one end from the beam, a vertically movable slide to which the other end of the chain is hung, and means for adjusting the connection of said chain with the beam in direction longitudinally of the beam.

7. In a scale or balance, the combination of a scale beam, a weighing chain hung at one end from the beam, a vertically movable slide to which the other end of the chain is hung, the chain being hung to the beam with an adjustable knife edge connection.

8. The combination with a beam having a V-grooved part carried thereby, of a chain, and a ring having a V-edge hung on said V-grooved part and from which the chain is hung.

9. The combination with a beam having a V-grooved part carried thereby and adjustable longitudinally of the beam, of a chain, and a ring having a V-edge hung on said V-grooved part and from which ring the chain is hung, said ring arranged in a plane coincident with the plane in which the chain hangs.

10. The combination with a beam of an adjusting screw engaging it and adjustable longitudinally of the beam, said screw having a V-grooved head, of a chain, and a ring from which the chain is hung having a V-edge hung in the groove of said head.

In witness whereof, I have hereunto signed my name in the presence of two subscribing witnesses.

CHRISTOPHER A. BECKER.

Witnesses:
 RENÉ BRUINE,
 FRED WHITE.